June 10, 1952

C. H. FAY ET AL 2,600,051

SEISMOGRAPH AMPLIFIER CONTROL

Filed Dec. 20, 1949

Inventors: Charles H. Fay
Thorwald J. Tvedt
By: [signature]
Their Attorney

Patented June 10, 1952

2,600,051

UNITED STATES PATENT OFFICE 2,600,051

SEISMOGRAPH AMPLIFIER CONTROL

Charles H. Fay and Thorwald J. Tvedt, Houston, Tex., assignors to Shell Development Company, San Francisco, Calif., a corporation of Delaware Application December 20, 1949, Serial No. 134,006

6 Claims. (Cl. 178—44)

This invention pertains to seismic exploration, and relates more particularly to an automatic volume control (AVC) system for the amplifier network of recording seismographs.

In seismic exploration, the energy of artifically generated ground or water pressure or velocity waves is translated into electric signals or impulses and these impulses are recorded, with suitable amplification, in the form of seismograms.

The electric impulses produced by a detector in response to seismic waves vary greatly in intensity during the time of recording of a single seismogram. It is, therefore, necessary to compensate for the disproportion in the magnitude of said impulses by varying the sensitivity of the amplifiers used between the detectors and the recorder in such a manner as to obtain a record of oscillations of controlled amplitude, permitting a ready interpretation of the seismogram.

The various AVC or automatic volume control systems which have been developed for this purpose are generally satisfactory in operation, being however, subject to the following drawbacks: undue complexity resulting in heavy and cumbersome equipment; lack of discrimination between signal and control voltages, resulting in the recording of spurious signals; undue sensitivity to characteristics of individual tubes, resulting in elaborate care being required in matching and aging said tubes; and deficient dynamic control characteristics, resulting in unsymmetrical response to increase or decrease of signal intensity, and to unequal response at different signal intensity levels.

It is, therefore, an object of this invention to provide a rugged, simple and readily portable AVC system for seismic operations, said system requiring no balancing or matching of amplifier or control elements.

It is likewise an object of this invention to provide an AVC system inherently capable of distinguishing or discriminating between signal and control voltages.

It is also an object of this invention to provide an AVC system giving a proper dynamic response at any desired signal intensity level.

It is a particular object of this invention to provide an AVC system having a thermally variable non-linear resistance as a control element, said element forming an arm of a Wheatstone bridge circuit.

These and other objects of the invention will be understood from the following description, taken with reference to the attached drawing wherein.

Figure 1:
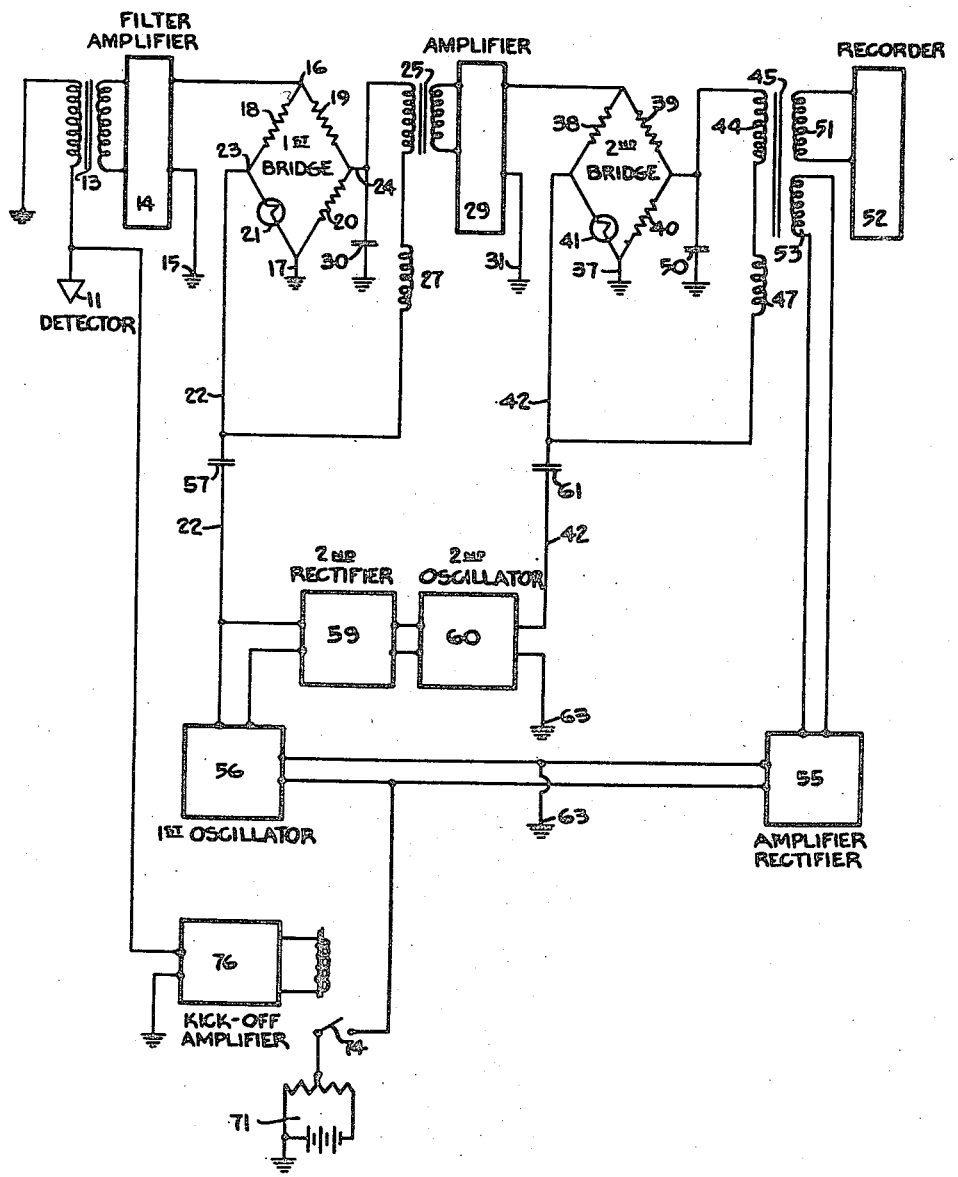
Figure 1 is a simplified circuit diagram of the automatic volume control system of the present invention.

Referring to Figure 1, a seismometer or detector 11 translates seismic waves, such as may be generated by detonating an explosive charge in the ground, into electrical impulses or signals which are transmitted, for example, through a line having a transformer 13 to a filter and amplifier unit 14, comprising the suitable filter, multistage amplifier and noise level attenuator circuits, as well understood in seismic recording.

One of the output terminals of unit 14 may be grounded at 15, and the other terminal is connected at a point 16 to a first control bridge of the Wheatstone type, grounded at 17.

Three of the arms of the control bridge comprise suitably matched linear resistors 18, 19 and 20, while the fourth arm comprises a non-linear thermally variable resistance element 21.

Although theoretically it is possible to use in the present system any desired non-linear resistor, such as a thermistor, it has been found that the thermal time constant of these elements is too long for the desired application, and that they have also other undesirable characteristics, such as their rectifying tendencies.

It is, therefore, proposed to use, according to the present invention, a high-resistance incandescent lamp filament, such, for example, as that of a tungsten filament, indicating lamp of approximately 3 watt, 120 volt rating.

Although the theoretical resistance of such a lamp at full current is 4800 ohms, its cold resistance is only about 400 ohms, while a power input of only 40 milliwatts is sufficient to bring said resistance to about 1400 ohms, its temperature being then about 800° Kelvin.

Although the thermal time constant of the non-linear resistor element 21 at ambient room temperatures is relatively long, it will be understood that since said element loses heat chiefly by radiation, it can be cooled more rapidly than a device of the same room temperature time constant, which depends on thermal conduction.

Figure 2:
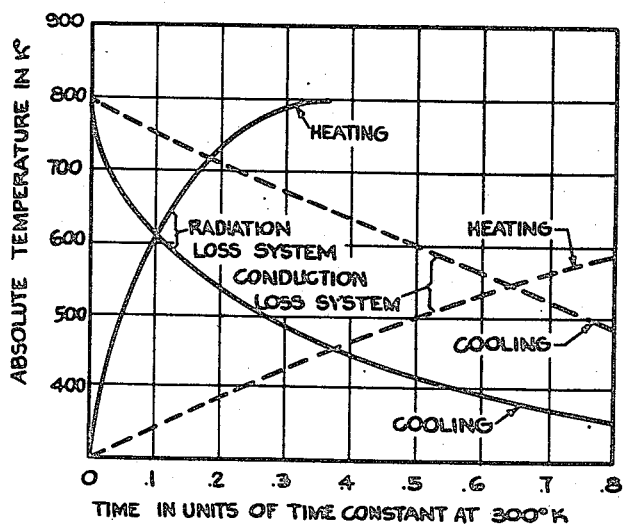
Figure 2 illustrates heating and cooling curves for radiation and conduction loss systems.

Heating and cooling curves for these two mechanisms of heat transfer are shown in Figure 2. The heating curves are for a constant power input required to bring the final temperature to 800° Kelvin, and the cooling curves are for cooling to a room temperature of 300° K. The significance of these curves will be dealt with hereinbelow.

It will be seen that with properly selected values of the resistances 18, 19 and 20, the balance of the bridge may be controlled by the variable resistance of the element 21, which will depend on the heating current passed therethrough by means of a lead 22, for example, between point 23 and the ground 17, in a manner to be described hereinbelow.

The voltage across the control bridge, that is, the voltage appearing between points 23 and 24, is zero when the bridge is balanced. When the bridge is unbalanced, an output voltage appears and a current flows between points 23 and 24 and is applied to the primary of an isolation transformer 25, whose secondary is connected to an amplifier unit 29, having any desired number of stages.

It is understood from the preceding that in the present control system large ranges of gain with variations of lamp resistance are obtained by using the lamp 21 as one arm of the control bridge and supplying thereto a variable control or heating current. In order to prevent variable control current from introducing into the system spurious signals, it is preferable to supply the heating current at a frequency remote from the seismic frequencies at which true signals from the detector 11 are delivered to the bridge. Radio frequencies such for example as those of the order of one megacycle per second have been found very satisfactory for this purpose.

The manner in which the heating radio frequency current is produced, controlled and supplied to the bridge will be described hereinbelow. Meanwhile, it may be stated that since this radio-frequency control voltage is amplitude-modulated with control-rectifier ripple and varies in addition with the near-direct current component of rectifier output, it is essential that no rectification of control voltage should take place in or following the control bridge. In other words, it is necessary to insure that radio frequency current should not reach the grids of the amplifiers in unit 29 in sufficient volume to produce a rectification effect there. For this purpose, a radio frequency choke 27 is connected in series with the isolation transformer. A grounded condenser 30 of suitable value connected to the proper input terminal of the isolation transformer may be required to avoid phase shift due to reaction unbalance of the bridge at high suppression, depending on the capacitances to ground associated with the transformer input terminals.

The amplifier unit 29, which is grounded at 31, is connected to a second control bridge in the same manner as amplifier 14 is connected to the first one.

The second control bridge, grounded at 37 and having linear resistances 38, 39, 40 and the non-linear resistance 41 in its four arms, is similar in organization and operation to the first control bridge, as described above.

The heating radio-frequency current is supplied to the second bridge by means of a lead 42, in a manner to be described hereinbelow.

The unbalance output voltage appearing across said bridge is applied to the primary 44 of a transformer 45 through a radio-frequency choke coil 47. Condenser 50 has the same function as condenser 30 in the first bridge.

The secondary 51 of transformer 45 is connected to the input of a seismic recorder 52 such as a multi-string galvanometer oscillograph, which may be of any desired type.

The secondary 53 of the transformer 45 is connected to the input of an amplifier-rectifier unit 55, comprising a rectifier preceded by a desired number of amplification stages.

The D. C. output of the rectifier unit 55 is applied to a grid-modulated radio-frequency oscillator 56, whose A. C. output serves partly as a source of heating or control current to the first bridge through the lead 22 and a condenser 57, and partly as input to a second rectifier 59, whose output is in turn applied to grid-modulated second radio-frequency oscillator 60. The A. C. output current of the second oscillator is used as the heating current for the second bridge, being applied thereto through lead 42 and a condenser 61. The units 55, 56, 59 and 60 are preferably grounded as shown at 63. It will be understood that condensers 57 and 61 are small enough not to significantly affect the balance of the corresponding bridges, their effect being moreover compensated by the choice of values of condensers 30 and 50.

With the foregoing in mind, the operation of the present system may be briefly described as follows:

The system is normally adjusted so that in the absence of a signal the first oscillator 56 operates at maximum amplitude, while the second oscillator 60 is substantially cut off. Accordingly, the first bridge receives a heating current of an intensity sufficiently large to increase the temperature and, therefore, the resistance of the non-linear element 21 beyond the selected balance point of the bridge. For example, if the bridge is balanced when the resistor 21 is heated to 600° K. corresponding to a resistance value of 1000 ohms, sufficient current is supplied at this moment to the first bridge to raise its temperature to 800° K. corresponding to a resistance of 1400 ohms. The first bridge may thus be defined as being normally unbalanced on the hot or high-resistance side.

At the same time, the full-amplitude output current of the first oscillator 56, after rectification by the rectifier 59, is applied as a negative bias to the second oscillator 60, thus cutting the intensity of the heating current passed through the non-linear element 41 of the second bridge to a value sufficiently low to decrease the temperature and, therefore, the resistance of said non-linear element below the balance point of the bridge. For example, if the second bridge is likewise balanced when the resistor 41 is heated to 600° K. corresponding to a resistance value of 1000 ohms, only sufficient current is supplied thereto at this moment to raise its temperature to 400° K. corresponding to a resistance of 600 ohms. The second bridge may thus be defined as being normally unbalanced on the cold or low-resistance side.

This condition prevails so long as no signals, or signals of sub-normal and normal amplitude are received from the detector 11. When, however, the signals from the detector reach a voltage level higher than normal, these signals, passing the amplification units 14 and 29 and the two bridges with an amplification gain depending on the degree of unbalance of said bridges, are transmitted to the rectifier unit 55 by transformer secondary 53. The rectified signals are then applied as a modulating negative D. C. grid bias of a value higher than before to the first oscillator 56 so as to decrease the amplitude of its output or control current.

The first bridge, which had been operating unbalanced on the hot (or high-resistance) side because of this excessive heating or control current normally supplied thereto, is thus brought back closer to the balance point. Accordingly, the magnitude of the potentials appearing between points 23 and 30 and fed to the amplifier 29 is decreased.

At the same time, the decreased amplitude output of the first oscillator 56, after rectification by the rectifier 59 and application as negative grid bias to the grid-controlled second oscillator 60, is not able to reduce the output of said oscillator 60 to the same low value as before. The intensity of the heating or control current supplied to the second bridge is thus increased, and said second bridge, whose unbalance was on the cold or low-resistance side, is likewise brought back closer to the balance point. The magnitude of the potentials appearing across said bridge and applied through the transformer 45 to the recorder 52 and the control units 55, 56, 59 and 60 is, therefore, likewise decreased.

From the above, it will be seen that automatic volume control is achieved in the present system by the action of two normally unbalanced bridges symmetrically approaching balance from opposite directions in case of an increasing signal intensity level, when a decrease of sensitivity is required, or symmetrically moving away from the balance in case of a decreasing signal intensity level, when an increase of sensitivity is required. The system is, therefore, basically symmetrical with regard to operation under increasing or decreasing amplification gain conditions. The system is also substantially insensitive to random disparities in the characteristics of individual vacuum tubes used in the various amplification stages.

It is often desirable to operate the present system with an initially reduced gain, in order to improve the readability of initial impulses. This is conveniently done by applying a suitable fixed grid bias potential from a source 71 to grid-modulated oscillator 56 through relay operated contacts 74 initially closed, but opened by the arrival of an initial impetus to any of the detectors 11 of the system, through the agency of a so-called kick-off amplifier 76, in a manner well understood in the art. Said bias potential operates similarly to that normally derived from rectifier unit 55 to reduce the amplifier gain by bringing both bridges closer to balance.

The transient response of the present type of control to a change in signal intensity is necessarily determined mainly by the heating and cooling characteristics of the lamp filament or filaments used. Very little delay filtering of control rectifier output should be employed, as otherwise the bridge may be driven through the balance point.

Control response can, however, be considerably varied by the choice of the balance point resistance, choice of operation on the hot or cold side of the balance, and choice of maximum heating power.

At high suppression a smaller change of resistance is required to produce a given change in gain. Thus, in the example used hereinabove, it will be noted that the first bridge has a maximum non-linear filament resistance of 1400 ohms, and a balance point resistance of 1000 ohms, corresponding to a temperature of about 600° K. The unbalance resistance at maximum amplification gain is thus 400 ohms. To suppress 20 decibels the unbalance must be reduced to one-tenth of its value or to about 40 ohms, which is equal to a change of 360 ohms; to suppress another 20 decibels, the unbalance resistance must be further reduced to about 4 ohms, an additional change of only 36 ohms. The rate of change of gain thus tends to increase with suppression.

This behavior of the present control system is quite advantageous if it is desired to operate at different rates of change for increase and decrease of amplification gain at different levels of suppression, since said rates can be determined from the slopes of the appropriate heating and cooling curves such as illustrated in Figure 2. For example, the choice of a lower bridge balance point resistance will be seen to result in a slightly larger maximum rate of increase of gain and a considerably smaller maximum rate of decrease of gain at high suppression, since the heating curve is slightly steeper and the cooling curve considerably flatter at the lower balance point temperature.

It will be obvious to those familiar with the use of electronics in seismic recording that although the present system has been described for brevity only with regard to a system wherein the first bridge is unbalanced on the hot or high-resistance side, and the second was unbalanced on the cold or low resistance side, a substantially identical or equivalent sequence of control events may be caused to ensue if the system is modified to reverse the adjustment of said bridges, so that the first bridge operates on the cold or low-resistance side, while the second bridge operates on hot or high-resistance side. Likewise, systems comprising only one bridge or two bridges both operating on the hot or cold side of the balance point are also operative and satisfactory, particularly in cases where it is desired to obtain a very rapid control response or recovery at high suppression levels. Such modifications, which do not depart from the principle of this invention, are, therefore, fully embraced within the scope of the present claims.

We claim as our invention:

1. A gain control system for seismic amplifiers, said control system comprising a first normally unbalanced bridge connected to receive input signals, a second normally unbalanced bridge connected to receive the current flowing across said first bridge, the magnitude of said current being a function of the unbalance of said first bridge, said first and second bridges each having linear resistors in three arms thereof and a thermal non-linear resistor in the fourth arm thereof, rectifier means connected to rectify the current flowing across the second bridge, the magnitude of said current being a function of the unbalance of said second bridge, first oscillator means connected to have their A. C. output controlled by the D. C. output of said rectifier means, means for passing a portion of the A. C. output of said first oscillator means through the thermal non-linear resistor of the first bridge, thereby changing the resistance value thereof in such a direction as to decrease the unbalance of the first bridge with increasing intensity of input signals, a second rectifier connected to rectify another portion of the A. C. output of the first oscillator means, second oscillator means connected to have their A. C. output controlled by the D. C. output of the second rectifier means, and means for passing the A. C. output of the second oscillator means through the thermal non-linear resistor of the second bridge, thereby changing the value thereof in such a direction as to decrease the unbalance of the second bridge with increasing intensity of input signals.

2. The system of claim 1 wherein the first and the second oscillator means are grid-controlled radio-frequency oscillators, the D. C. output of the first and second rectifiers being applied to the grids of said first and second oscillators respectively.

3. The system of claim 1, wherein the thermal non-linear resistor of the first bridge is operated at a point of its temperature-resistance curve such that the resistance value thereof at normal signal intensity level is above that required to maintain the bridge at balance point, and the thermal non-linear resistor of the second bridge is operated at a point of its temperature-resistance curve such that the resistance value thereof at normal signal intensity level is below that required to maintain the bridge at balance point.

4. The system of claim 1, wherein an increase of signal intensity results in a decrease of the A. C. output of the first oscillator and in an increase of the A. C. output of the second oscillator.

5. A gain control system for seismic amplifiers said system comprising an input transformer, an output transformer, a first normally unbalanced control circuit connected to the input transformer and comprising a first thermal non-linear resistance element in a branch thereof, a second normally unbalanced control circuit comprising a second thermal non-linear resistance element in a branch thereof connected to said first circuit and to said output transformer, rectifier means connected to rectify at least a portion of the output transformer current, the magnitude of said current being a function of the unbalance of said two control circuits, oscillator means connected to have their A. C. output controlled by the D. C. output of said rectifier means, means for passing a portion of the A. C. output of the oscillator means as a heating current through said first thermal non-linear resistance element, thereby changing its resistance value so as to decrease the unbalance of the first control circuit, and means for passing another portion of the A. C. output of the oscillator means as a heating current through said second thermal non-linear resistance element, thereby changing its resistance value so as to decrease the unbalance of the second control circuit, the heating current passed through one of said elements increasing and the heating current passed through the other element decreasing with an increasing intensity of input signals.

6. A gain control system for seismic amplifiers, said system comprising an input signal transformer, an output signal transformer, a first normally unbalanced control circuit comprising a first thermal non-linear resistance element in a branch thereof, said circuit being connected to said input transformer, a second normally unbalanced control circuit comprising a second thermal non-linear resistance element in a branch thereof, said second circuit being connected to said first circuit and to said output signal transformer, rectifier means connected to rectify at least a portion of the output transformer signals, the magnitude of said output signals being a function of the unbalance of said two control circuits, first oscillator means connected to have their A. C. output controlled by the D. C. output of said rectifier means, means for passing a portion of the A. C. output of said first oscillator means as a heating current through said first thermal non-linear resistance element, thereby changing its resistance value so as to decrease the unbalance of the first control circuit with increasing intensity of input signals, second rectifier means connected to rectify a portion of the A. C. output of the first oscillator means, second oscillator means connected to have their A. C. output controlled by the D. C. output of the second rectifier means, and means for passing the A. C. output of the second oscillator means as a heating current through the second thermal non-linear resistance element, thereby changing its resistance value so as to decrease the unbalance of the second control circuit with increasing intensity of input signals.

CHARLES H. FAY.
THORWALD J. TVEDT.

REFERENCES CITED

The following references are of record in the file of this patent:

UNITED STATES PATENTS

| Number | Name | Date |
|---|---|---|
| 2,137,020 | Luck | Nov. 15, 1938 |
| 2,462,551 | Renner | Feb. 22, 1949 |